(12) United States Patent
Archer et al.

(10) Patent No.: US 8,839,902 B1
(45) Date of Patent: Sep. 23, 2014

(54) HYDRAULIC MOTOR DRIVEN RACK AND PINION STEERING ASSEMBLY

(71) Applicant: Oshkosh Corporation, Oshkosh, WI (US)

(72) Inventors: David W. Archer, Hortonville, WI (US); Bruce D. Loomans, Oshkosh, WI (US); Troy R. Scott, Van Dyne, WI (US)

(73) Assignee: Oshkosh Corporation, Oshkosh, WI (US)

( * ) Notice: Subject to any disclaimer, the term of this patent is extended or adjusted under 35 U.S.C. 154(b) by 10 days.

(21) Appl. No.: 13/784,493

(22) Filed: Mar. 4, 2013

(51) Int. Cl.
*B62D 5/22* (2006.01)

(52) U.S. Cl.
CPC ........................................ *B62D 5/22* (2013.01)
USPC ......................................................... 180/428

(58) Field of Classification Search
CPC ......................................................... B62D 5/22
USPC ............................................. 180/428; 74/29
See application file for complete search history.

(56) References Cited

U.S. PATENT DOCUMENTS

| | | | |
|---|---|---|---|
| 4,137,989 A | 2/1979 | Rehfeld | |
| 4,275,641 A | 6/1981 | Kopp | |
| 4,351,228 A | 9/1982 | Schultz et al. | |
| 4,446,941 A | 5/1984 | Laurich-Trost | |
| 4,784,234 A | 11/1988 | Naito et al. | |
| 4,856,608 A | 8/1989 | Adams | |
| 4,986,382 A * | 1/1991 | Harrison | 180/428 |
| 5,251,717 A | 10/1993 | Klosterhaus | |
| 5,836,419 A | 11/1998 | Shimizu et al. | |
| 6,363,833 B1 | 4/2002 | Stoll | |
| 6,585,074 B2 | 7/2003 | Katou et al. | |
| 6,619,420 B1 | 9/2003 | Saarinen | |
| 6,945,353 B2 * | 9/2005 | Bishop | 180/446 |
| 2001/0000592 A1 | 5/2001 | Estes et al. | |
| 2006/0278466 A1 | 12/2006 | Cheng | |

* cited by examiner

*Primary Examiner* — Joseph M Rocca
*Assistant Examiner* — Felica L Brittman
(74) *Attorney, Agent, or Firm* — Foley & Lardner LLP

(57) ABSTRACT

A rack and pinion steering apparatus for a heavy-duty vehicle includes a housing, a gear rack slidably coupled to the housing and including a plurality of rack gear teeth, and a pinion gear including a plurality of pinion gear teeth in meshing engagement with the plurality of rack gear teeth. The apparatus also includes a hydraulic motor including an output shaft coupled to and configured to rotate the pinion gear and a limiter coupled to the housing and configured to reduce an output steering force of the gear rack.

11 Claims, 11 Drawing Sheets

HYDRAULIC MOTOR DRIVEN RACK AND PINION STEERING ASSEMBLY

BACKGROUND

The present application relates generally to the field of steering devices for vehicles. In particular, the present application relates to rack and pinion steering devices for heavy-duty trucks. Steering systems of vehicles provide a steering force to a steering knuckle, commonly through a portion thereof referred to as the steering arm. The steering knuckle interfaces with the tire and rotates about a kingpin axis to steer the vehicle. A tie rod is coupled to the steering arm in a location that is offset from the kingpin axis, and the tie rod transfers an output steering force from the steering assembly to the steering arm thereby producing a steering torque on the tire.

Axles for use in heavy-duty vehicles (e.g., fire trucks, military trucks, concrete mixer trucks, etc.) are specially designed to accommodate the axle load requirements of these vehicles. Indeed, the gross axle weight rating (GAWR) of an axle often impacts the design of each subcomponent of the axle assembly (e.g., control arms, steering knuckles, steering system, etc.). The weight of the vehicle or the GAWR of the axle impact the design of the steering system where, for example, a heavier vehicle may require a greater output steering force from the steering system. The width of the tires, the area of the contact patch between the tires and a ground surface, and still other factors may also influence the requisite steering force.

The weight of heavy-duty vehicles is much greater than passenger cars or light-duty vehicles. By way of example, a light-duty pickup truck may weigh 6,000 pounds and have a GAWR of 4,000 pounds whereas a fire truck may weigh 72,000 pounds and have a GAWR of 32,000 pounds. Further, heavy-duty vehicles often utilize wider tires than passenger cars or light-duty vehicles thereby producing a larger contact patch and increased resistive friction forces. By way of example only, heavy-duty vehicles may require in excess of 4,500 pounds of steering force to rotate a stationary tire on dry pavement. Traditional steering solutions for light-duty vehicles may not provide the steering forces required in a heavy-duty vehicle. Therefore, specially designed steering assemblies are required in light of, among other factors, the weight and increased contact patch area of heavy-duty vehicles.

Traditional steering systems for heavy-duty vehicles include a steering gear, a pitman arm, and several drag links. The drag links transfer a steering force from the pitman arm to the steering arms to rotate the steering knuckles. While steering gear systems are capable of producing the steering forces a heavy-duty vehicle requires, the axle assembly must be designed to allow for the movement of the various drag links. Facilitating such movement often constrains the design of other components, such as swing arms, side plates, and still other components.

Traditional passenger car and light-duty vehicles utilize rack and pinion steering systems to apply a steering force to the steering arm through tie rods. Rack and pinion steering systems may not require the use of drag link assemblies. Instead, rack and pinion steering systems include an input shaft coupled to both the steering column and a pinion gear. The pinion gear interfaces with a rack to convert rotational movement into lateral movement. An operator's rotation of the steering wheel is transmitted into the pinion gear and produces a lateral output steering force from the rack. In some passenger cars and light-duty vehicle systems, the number of rack gear teeth limits the lateral movement of the rack. Such a configuration prevents operators from continuing to rotate the steering wheel (i.e. over travel the gear rack) because the rack body interferes with the pinion gear teeth. A power steering system may supplement the output steering force produced by an operator with, by way of example, a hydraulic cylinder positioned parallel to the rack. However, systems for passenger cars and light-duty vehicles may not produce the steering forces a heavy-duty vehicle requires. Also, hydraulic cylinders oriented parallel to the rack may be susceptible to damage and debris from the road surface.

SUMMARY

One exemplary embodiment relates to a rack and pinion steering apparatus for a heavy-duty vehicle. The apparatus includes a housing, a gear rack slidably coupled to the housing and including a plurality of rack gear teeth, and a pinion gear including a plurality of pinion gear teeth in meshing engagement with the plurality of rack gear teeth. The apparatus also includes a hydraulic motor including an output shaft coupled to and configured to rotate the pinion gear and a limiter coupled to the housing and configured to reduce an output steering force of the gear rack.

Another exemplary embodiment relates to a rack and pinion steering apparatus for a heavy-duty vehicle. The apparatus includes a housing, a gear rack slidably coupled to the housing, and a pinion gear in meshing engagement with the gear rack. The apparatus also includes an auxiliary gear in meshing engagement with the pinion gear and a hydraulic motor including a rotatable output shaft engaged to rotate the auxiliary gear.

Still another exemplary embodiment relates to a heavy-duty vehicle. The heavy-duty vehicle includes a hydraulic fluid reservoir; a hydraulic pump in fluid communication with the hydraulic fluid reservoir; and a rack and pinion steering assembly. The rack and pinion steering assembly includes a housing; a gear rack slidably coupled to the housing, the gear rack including a plurality of rack gear teeth and configured to provide an output steering force; and a pinion gear having a plurality of pinion gear teeth in meshing engagement with the plurality of rack gear teeth. The rack and pinion steering assembly also includes a hydraulic motor including an output shaft coupled to the pinion gear, the hydraulic motor configured to rotate the pinion gear and a limiter, the limiter configured to reduce the output steering force.

The invention is capable of other embodiments and of being carried out in various ways. Alternative exemplary embodiments relate to other features and combinations of features as may be generally recited in the claims.

BRIEF DESCRIPTION OF THE FIGURES

The invention will become more fully understood from the following detailed description taken in conjunction with the accompanying drawings wherein like reference numerals refer to like elements, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Traditional rack and pinion steering systems for passenger cars and light-duty vehicles, even if increased in size and capacity, are not suitable for heavy-duty vehicle applications. The steering systems of passenger cars and light-duty vehicles may tolerate interference between the rack and pinion gears due to the relatively small steering forces involved. However, the relatively large steering forces required to rotate tires of a heavy-duty vehicle may cause such interference to damage the pinion gear, rack, or another component of the steering system (i.e. may cause over travel damage). According to an exemplary embodiment, the compact and modular steering system of the present application provides steering forces to rotate the tires of a heavy-duty vehicle without limiting the design of other axle components. In some embodiments, the steering assembly includes a limiter to reduce the risk of over travel damage.

Figure 1:
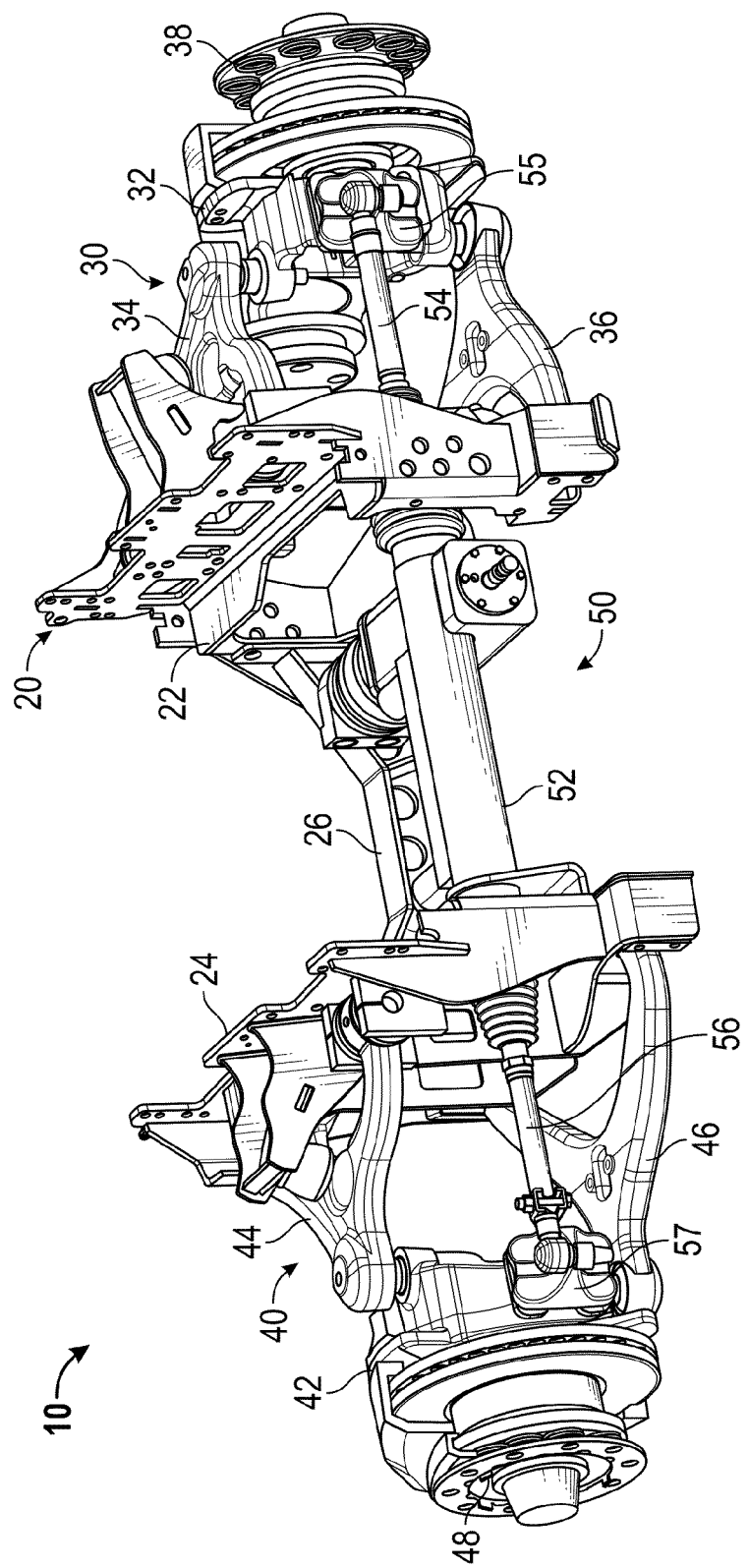
FIG. 1 is an elevation view of an axle assembly, according to an exemplary embodiment.

Referring to the exemplary embodiment shown in FIG. 1, an axle assembly, shown as axle assembly 10, interfaces with the body and tires of a vehicle. As shown in FIG. 1, axle assembly 10 includes a frame, shown as structural assembly 20, configured to support the various components of axle assembly 10 and interface with at least one of frame rails, a unitary frame design, or a "V-hull" design, among others. As shown in FIG. 1, structural assembly 20 includes a first side plate, shown as first side plate 22, a second side plate, shown as second side plate 24, and a cross member, shown as cross member 26. According to an exemplary embodiment, axle assembly 10 includes a left independent suspension assembly, shown as suspension assembly 30, and a right independent suspension assembly, shown as suspension assembly 40. It should be understood that suspension assembly 30 and suspension assembly 40 may include still other components (e.g., high pressure gas springs, resilient members, dampers, etc.), according to various alternative embodiments. In other embodiments, axle assembly 10 may include other types of suspension systems (e.g., leaf spring, air bag, etc.).

According to the exemplary embodiment shown in FIG. 1, axle assembly 10 includes a steering assembly, shown as steering assembly 50, configured to facilitate steering the vehicle. While shown engaging an independent suspension, it should be understood that steering assembly 50 may be included within axle assemblies having other types of suspension systems (e.g., leaf spring, air bag, etc.). In other embodiments, axle assembly 10 may include still other components (e.g., differential assemblies, drive shafts, half shafts, skid plates, etc.).

As shown in FIG. 1, suspension assembly 30 includes a support member, shown as steering knuckle 32. Steering knuckle 32 is supported between an upper swing arm, shown as upper swing arm 34, and a lower swing arm, shown as lower swing arm 36. In some embodiments, rotational centers of joints (e.g., ball joints) coupling steering knuckle 32 to upper swing arm 34 and lower swing arm 36 define coupling points, and an axis extending between the coupling points defines a kingpin axis. It should be understood that steering knuckle 32 may rotate about the kingpin axis. As shown in FIG. 1, suspension assembly 30 includes a wheel hub, shown as hub 38, rotatably coupled to steering knuckle 32 (e.g., with a wheel bearing, etc.). Hub 38 may rotate relative to steering knuckle 32 about a lateral axis extending in a direction transverse (i.e. perpendicular, angularly offset, etc.) to the longitudinal axis of the vehicle. According to an exemplary embodiment, hub 38 also rotates about the kingpin axis upon rotation of steering knuckle 32, and hub 38 is configured to engage a tire of the vehicle that interfaces with a road surface. Such a configuration allows an operator to turn the vehicle by rotating the steering knuckle 32 and hub 38.

According to an exemplary embodiment, a similar assembly is included on the opposing side of suspension assembly 40. The assembly includes a steering knuckle, shown as steering knuckle 42, supported between an upper swing arm, shown as upper swing arm 44, and a lower swing arm, shown as lower swing arm 46. As shown in FIG. 1, suspension assembly 40 also includes a wheel hub, shown as hub 48.

Referring still to the exemplary embodiment shown in FIG. 1, steering assembly 50 includes a rack and pinion assembly, shown as rack and pinion assembly 52, configured to provide an output steering force to turn the tires of the heavy-duty vehicle. In some embodiments, rack and pinion assembly 52 is fixed to structural assembly 20 and does not move relative to first side plate 22 or second side plate 24. Such a rack and pinion assembly 52 may engage structural assembly 20 directly (i.e. a surface of rack and pinion assembly 52 may be secured to a surface of structural assembly 20) or indirectly with, by way of example, various intermediate brackets.

According to an exemplary embodiment, steering assembly 50 includes a first tie rod, shown as tie rod 54, and a second tie rod, shown as tie rod 56. As shown in FIG. 1, tie rod 54 includes a first end configured to engage rack and pinion assembly 52 and a second end configured to engage steering knuckle 32. Similarly, tie rod 56 includes a first end configured to engage rack and pinion assembly 52 and a second end configured to engage steering knuckle 42.

In some embodiments, tie rod 54 and tie rod 56 may be directly coupled to steering knuckle 32 and steering knuckle 42, respectively. According to an exemplary embodiment, tie rod 54 and tie rod 56 engage steering knuckle 32 and steering knuckle 42 through intermediate steering arms, shown as steering arm 55 and steering arm 57. In either embodiment, the second ends of tie rod 54 and tie rod 56 interface with steering knuckle 32 and steering knuckle 42 in a location that is offset from the king pin axes. The output steering force provided by rack and pinion assembly 52 may be transferred through tie rod 54 and tie rod 56 into steering knuckle 32 and steering knuckle 42 thereby causing rotation of the tires about the kingpin axes.

Figure 2:
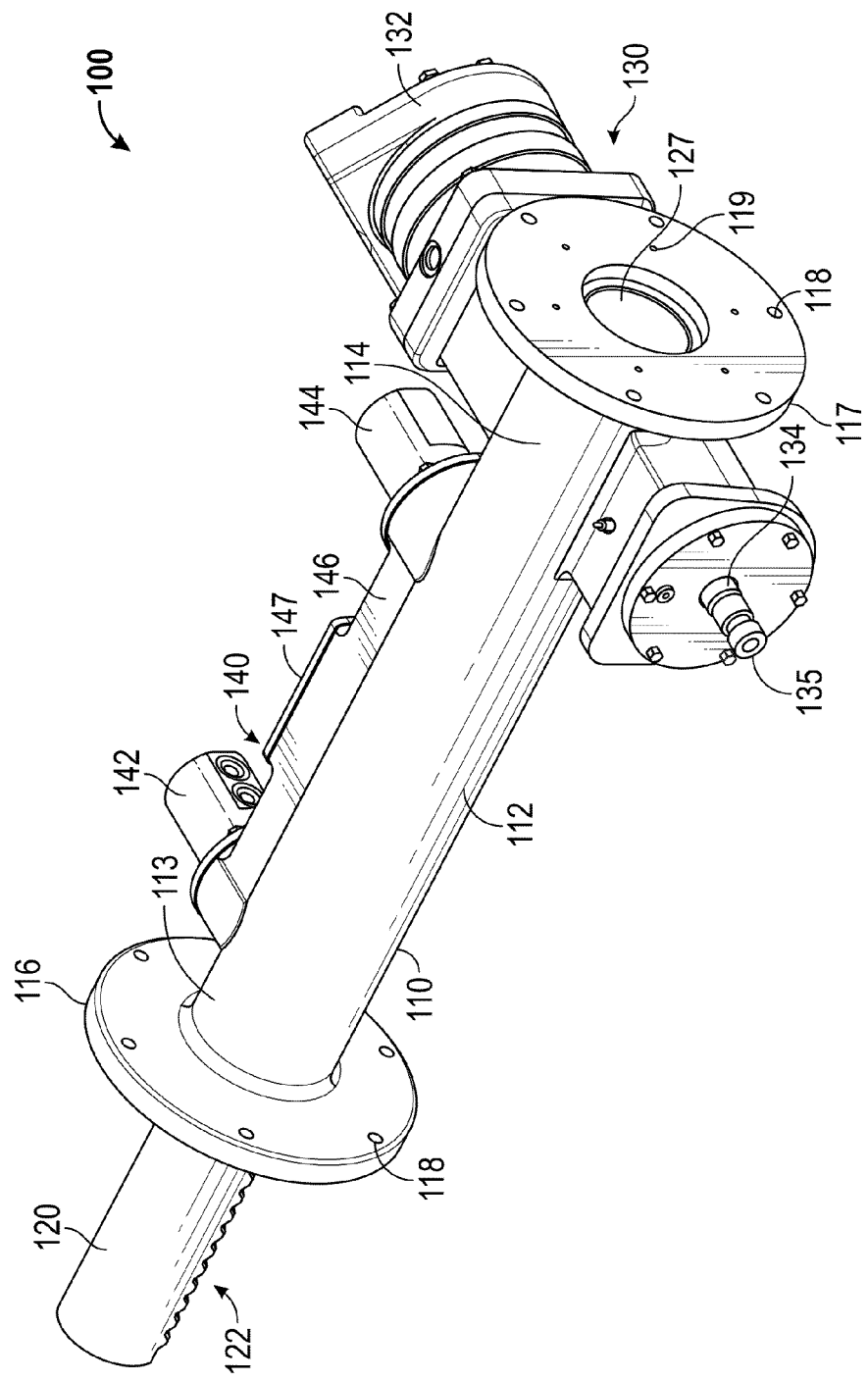
FIG. 2 is a front elevation view of a hydraulic motor driven rack and pinion steering assembly, according to an exemplary embodiment.

Referring next to the exemplary embodiment shown in FIGS. 2-6, a rack and pinion steering assembly, shown as rack and pinion steering assembly 100, is configured to provide an output steering force to rotate the tires of a vehicle. As shown in FIG. 2, rack and pinion steering assembly 100 includes a housing, shown as housing 110, a gear rack, shown as rack member 120, a drive system, shown as drive system 130, and a relief system, shown as relief system 140.

According to an exemplary embodiment, housing 110 includes a body member, shown as tubular portion 112. Tubular portion 112 comprises an elongated member having a first end, shown as first end 113, and a second end, shown as second end 114. As shown in FIG. 2, tubular portion 112 includes a circular cross-sectional shape that receives rack member 120. In some embodiments, housing 110 includes a first interface, shown as annular member 116, coupled to tubular portion 112 at first end 113 and a second interface, shown as annular member 117, coupled to tubular portion 112 at second end 114. In some embodiments, portions of housing 110 may be individually fabricated and coupled (e.g., welded, adhesively secured, etc.) together. According to an exemplary embodiment, housing 110 comprises a cast component having interfacing surfaces that are subsequently machined.

As shown in FIG. 2, annular member 116 and annular member 117 define a first set of apertures, shown as mounting apertures 118, and a second set of apertures, shown as bellows apertures 119. According to an exemplary embodiment, annular member 116 and annular member 117 are configured to couple rack and pinion steering assembly 100 to a vehicle with fasteners positioned through mounting apertures 118. By way of example, fasteners may extend through the side plates of an axle assembly and mounting apertures 118 to secure rack and pinion steering assembly 100 at least partially between the frame rails of the vehicle. According to an alternative embodiment, rack and pinion steering assembly 100 may be secured with fasteners extending through mounting apertures 118 and a portion of a unitary framed vehicle, a "V" hulled vehicle, or still another portion of a heavy-duty vehicle.

Rack and pinion steering assembly 100 may also improve the structural rigidity of a heavy-duty vehicle. By way of example, housing 110 may interface between various structural elements of the heavy-duty vehicle (e.g., frame rails, portions of a unitary framed vehicle, opposing sides of a "V" hulled vehicle, etc.). In such a configuration, rack and pinion steering assembly 100 may both provide an output steering force and reduce the cost and complexity of an axle assembly by also serving as a structural cross member. According to still another alternative embodiment, rack and pinion steering assembly 100 may be otherwise coupled to a heavy-duty vehicle.

Figure 5:
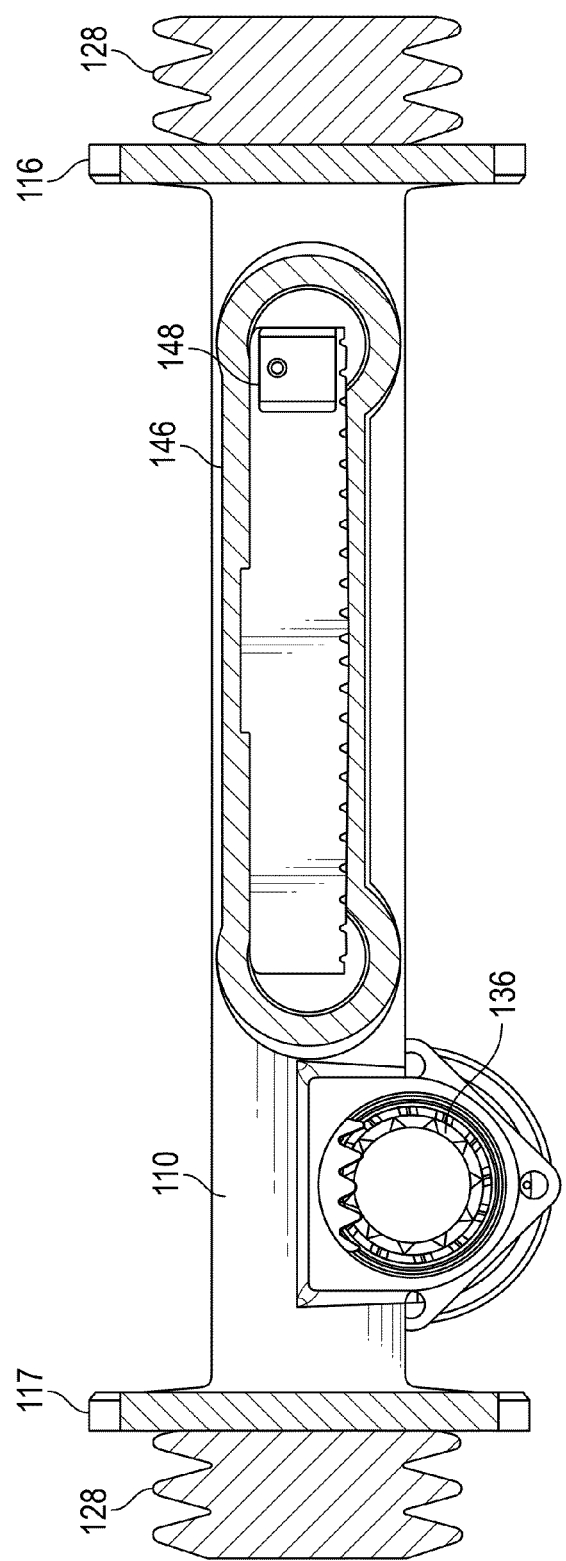
FIG. 5 is a sectional view of a hydraulic motor driven rack and pinion steering assembly, according to an exemplary embodiment.

According to the exemplary embodiment shown in FIG. 5, fasteners may extend into bellows apertures 119 to secure protective members, shown as extendable bellows 128, to rack and pinion steering assembly 100. Extendable bellows 128 may protect the various internal components of rack and pinion steering assembly 100 (e.g., gear rack teeth, pinion gear teeth, the sliding surface of the gear rack, various internal bearings, etc.) from debris that may otherwise enter through the end of tubular portion 112. In some embodiments, extendable bellow 128 includes a first end secured to annular member 116 and a second end configured to interface with a surface of a first tie rod. A second extendable bellow 128 may include a first end secured to annular member 117 and a second end configured to interface with a surface of a second tie rod. According to an alternative embodiment, rack and pinion steering assembly 100 may include another protective system (e.g., a series of telescoping tubular members, a seal configured to engage a surface of the gear rack, etc.) to prevent debris from damaging internal components.

According to an exemplary embodiment, rack member 120 comprises an elongated bar, and a length of the elongated bar defines a longitudinal axis of the rack member. As discussed above, tie rods may be coupled to ends of rack member 120, engage steering knuckles of an axle assembly, and transmit output steering forces from rack member 120 to rotate tires of a vehicle. As shown in FIG. 2, rack member 120 includes a circular cross section. In other embodiments, rack member 120 may have a different shape (e.g., a rectangular cross section, a tubular shape, etc.). As shown in FIG. 2, rack member 120 defines a plurality of rack gear teeth along a bottom portion of the elongated bar member.

Figure 3:
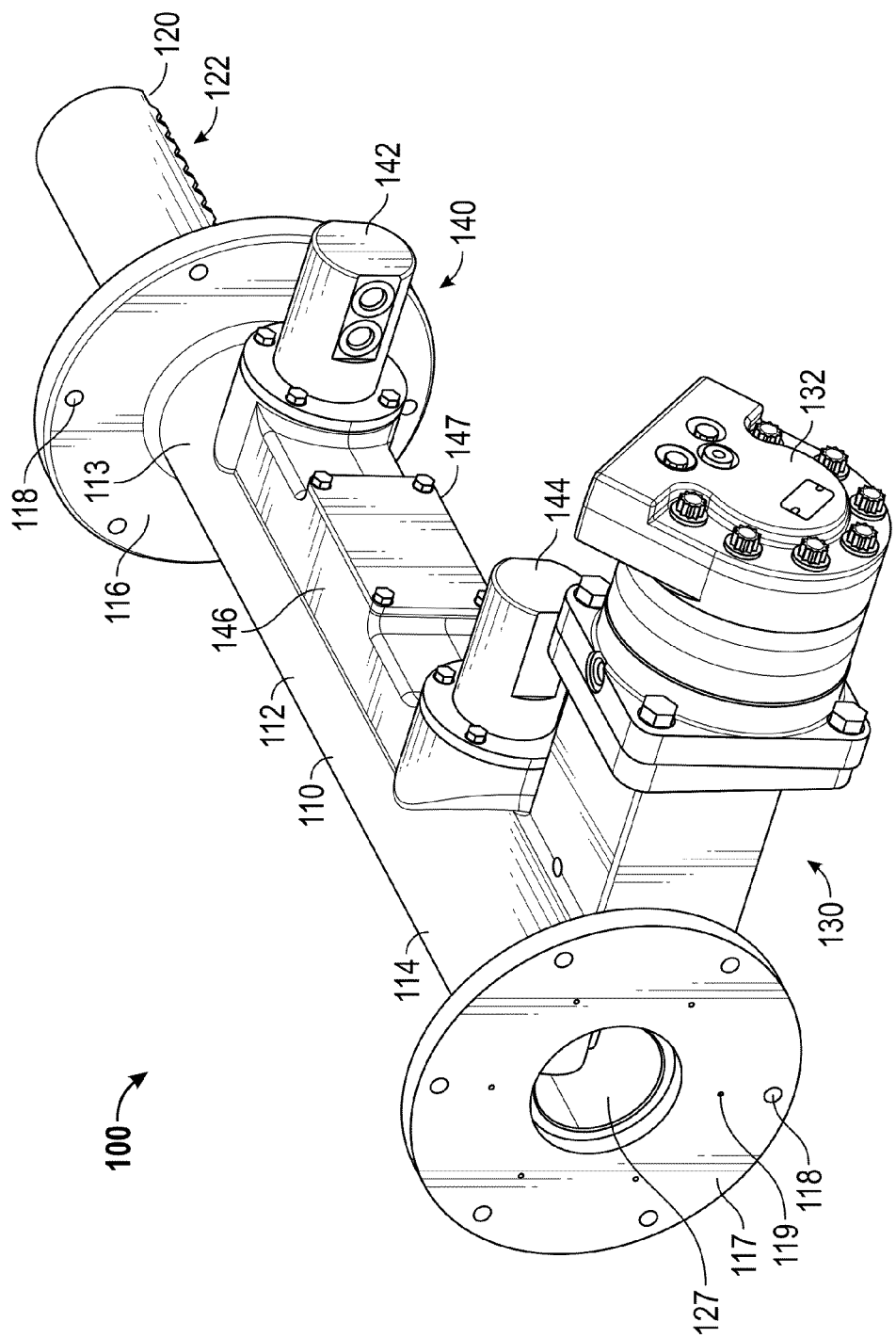
FIG. 3 is a rear elevation view of a hydraulic motor driven rack and pinion steering assembly, according to an exemplary embodiment.
Figure 4:
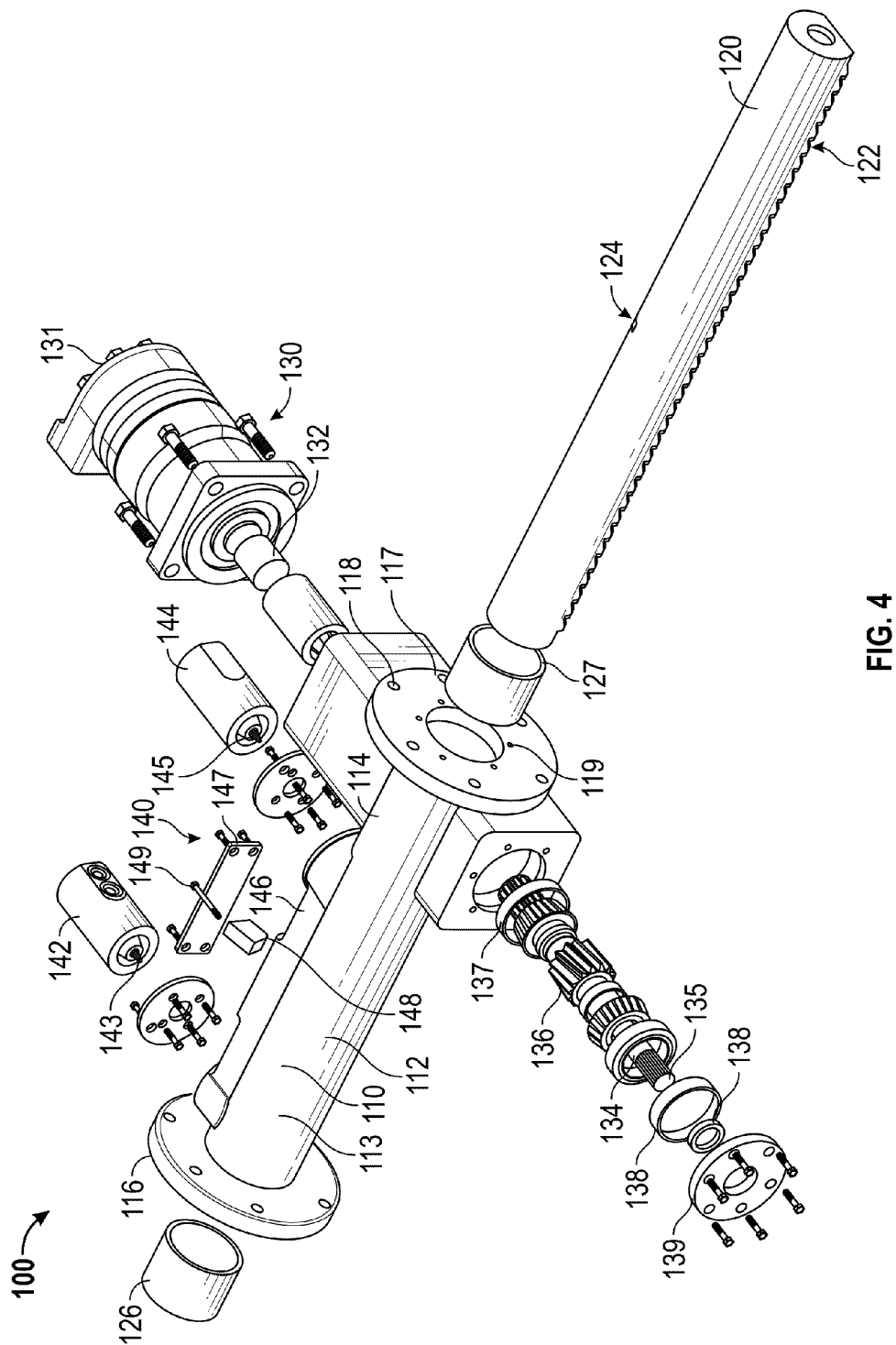
FIG. 4 is an exploded view of a hydraulic motor driven rack and pinion steering assembly, according to an exemplary embodiment.

According to the exemplary embodiment shown in FIG. 4, rack member 120 is slidably coupled to housing 110 with a first sleeve bearing, shown as sleeve bearing 126, and a second sleeve bearing, shown as sleeve bearing 127. In some embodiments, sleeve bearing 126 and sleeve bearing 127 are manufactured from brass. In other embodiments, sleeve bearing 126 and sleeve bearing 127 comprise a polymer or another suitable material. As shown in FIGS. 2-3, sleeve bearing 126 and sleeve bearing 127 are secured (e.g., pressed into, adhesively secured, etc.) within housing 110. Sleeve bearing 126 and sleeve bearing 127 may facilitate movement of rack member 120 between a first lateral position and a lateral second position. In various alternative embodiments, arrangements of bearings, bushings, or other components may couple rack member 120 to housing 110.

Referring still to the exemplary embodiment shown in FIGS. 2-6, drive system 130 actuates rack member 120 to provide an output steering force. As shown in FIGS. 2-6, drive system 130 includes a motor, shown as hydraulic motor 131 and a manual input shaft, shown as input shaft 134. As shown in FIG. 4, hydraulic motor 131 includes an output shaft, shown as output shaft 132. In some embodiments, output shaft 132 of hydraulic motor 131 is coaxial with input shaft 134.

Input shaft 134 may be coupled to output shaft 132 of hydraulic motor 131 with a coupler, shown as coupler 133, according to an exemplary embodiment. Such coupling may be achieved according to various known methods. As shown in FIG. 4, output shaft 132 of hydraulic motor 131 and an end of input shaft 134 both include male splined portions. Coupler 133 includes a female splined portion configured to engage the male splined portions of output shaft 132 and the end of input shaft 134. In other embodiments, coupler 133 may rotationally couple hydraulic motor 131 with input shaft 134 using a keyed connection or still another interface.

As shown in FIG. 4, input shaft 134 includes a pinion gear, shown as pinion gear 136, which defines pinion gear teeth configured to engage the rack gear teeth of rack member 120. According to an exemplary embodiment, pinion gear 136 and rack member 120 define a plurality of spur gear teeth. According to an alternative embodiment, pinion gear 136 and rack member 120 define a plurality of helical gear teeth. As shown in FIG. 4, drive system 130 includes a plurality of bearings, shown as bearings 137, to facilitate the rotation of input shaft 134. Bearings 137 include an inner race configured to engage a step (i.e. protrusion, etc.) defined on input shaft 134 and an outer race configured to engage a corresponding opening defined by housing 110. Various spacing elements, shown as spacers 138, may facilitate setting a preload force on bearings 137, and a cover, shown as plate 139, may secure the components of drive system 130 within housing 110.

In some embodiments, coupler 133 rotationally couples the motor output with an input end, shown as input end 135, of input shaft 134. As shown in FIG. 4, pinion gear 136 is coupled to both input end 135 and output shaft 132 of hydraulic motor 131. It should be understood that input end 135 may be coupled with the steering wheel of a heavy-duty vehicle. Such coupling allows at least a portion of an operator's applied steering torque to be transmitted into input end 135, through input shaft 134, and to rack member 120 by way of pinion gear 136.

As shown in FIG. 4, drive system 130 allows allow an operator and the hydraulic motor to rotate a single pinion gear. According to an exemplary embodiment, positioning input shaft 134 coaxial with output shaft 132 of hydraulic motor 131 reduces at least one of the height and width of rack and pinion steering assembly 100. An input shaft 134 and output shaft 132 that are coaxial with hydraulic motor 131 reduces the cost of rack and pinion steering assembly 100 by reducing the requisite number of pinion gears and the complexity of rack member 120, housing 110, and still other components.

In other embodiments, input shaft 134 may be offset (e.g., laterally offset, angularly offset, etc.) from the output shaft of hydraulic motor 131. Such an offset input shaft may include a second pinion gear in meshing engagement with the rack gear teeth. According to an alternative embodiment, the rack member includes a second set of rack gear teeth positioned, by way of example, ninety degrees about the longitudinal axis relative to the first set of rack gear teeth. Such a second set of rack gear teeth may be in meshing engagement with a second pinion gear coupled to input shaft 134. While potentially increasing the cost to manufacture the rack and pinion steering assembly 100 (e.g., additional pinion gear, additional rack gear teeth, etc.), a coupler may engage an offset input shaft 134 of the alternative embodiment from above or below rather than from a side of rack and pinion steering assembly 100.

According to an exemplary embodiment, drive system 130 is coupled to housing 110 at second end 114 and relief system 140 is coupled to tubular portion 112 of housing 110. As shown in FIG. 4, drive system 130 and relief system 140 are positioned within the same plane (i.e. relief system 140 is not angularly offset from drive system 130 relative to the longitudinal axis of rack member 120). Such a configuration of drive system 130 and relief system 140 provides a compact design having a reduced total height thereby improving the ability to package rack and pinion steering assembly 100 within a heavy-duty vehicle.

According to an alternative embodiment, relief system 140 may be angularly offset from drive system 130 relative to the longitudinal axis of rack member 120 (e.g., such that relief system 140 extends upward from tubular portion 112). Such an alternative configuration may allow for additional components of an axle assembly to be positioned in the same plane as drive system 130, may further protect relief system (e.g., during a blast condition or from impacts with debris), or may provide still other benefits. In embodiments where relief system 140 is angularly offset from drive system 130, drive system 130 may be positioned along the length of relief system 140 (e.g., between first relief valve 142 and second relief valve 144, etc.) thereby providing, among other benefits, a rack and pinion steering assembly 100 having a reduced overall width.

As shown in FIG. 2, drive system 130 is positioned across the longitudinal axis of rack member 120 at second end 114 of housing 110. According to an exemplary embodiment, drive system 130 is perpendicular (e.g., within a tolerance of one degree) to rack member 120. According to an alternative embodiment, drive system 130 may be angularly offset (e.g., 30 degrees, 45 degrees, etc.) from rack member 120.

According to an exemplary embodiment, relief system 140 reduces the likelihood that an operator will over travel rack member 120 (i.e. extend rack member 120 laterally beyond a preferred location). Over travel may be particularly damaging to steering assemblies for heavy-duty vehicles due, at least in part, to the larger steering forces involved. Such over travel may damage the gear teeth of rack member 120 and pinion gear 136 where, by way of example, the rack includes a toothed portion and a non-toothed portion (i.e. the bar shaped portion having a circular cross section and not including gear teeth) and an operator attempts to rotate pinion gear 136 beyond the toothed portion of rack member 120. Such motion may not cause damage to passenger cars or light-duty vehicles due to the smaller steering forces involved (i.e. pinion gear teeth may not contact the non-toothed portion of gear rack member 120 with forces sufficient to cause damage). However, over travel with the larger steering forces of heavy-duty vehicles and steering assembly 100 may deform, chip, or cause other damage to the gear teeth of pinion gear 136 or rack member 120. Over travel may also cause damage steering components, suspension components, fenders, or other components where, by way of example, a tire or steering knuckle is forced beyond a preferred location.

According to the exemplary embodiment, relief system 140 includes valves configured to reduce the pressure of hydraulic fluid applied to hydraulic motor 131 as rack member 120 reaches specified lateral positions. According to an alternative embodiment, relief system 140 may include a sensor configured to at least one of send and receive signals from a microprocessor. Such a sensor may be configured to send a signal indicating that rack member 120 has reached a first lateral position or a second lateral position. By way of example, the sensor may include a switch configured to be at least one of physically, magnetically, or otherwise actuated by a corresponding portion of rack member 120. Upon receipt of such a signal, a microprocessor may be configured to signal an alarm to the driver (e.g., display a warning light, signal an audible alarm, etc.), turn off the hydraulic pump supplying pressurized flow to the hydraulic motor, send a signal to open a hydraulic relief valve, or perform still another task. In still other embodiments, relief system 140 includes components that physically restrict the motion of rack member 120 relative to housing 110.

As shown in FIGS. 2-6, relief system 140 includes a first relief valve, shown as first relief valve 142 and a second relief valve, shown as second relief valve 144. According to an exemplary embodiment, first relief valve 142 and second relief valve 144 are coupled to a base, shown as base 146, positioned along tubular portion 112 of housing 110. In some embodiments, base 146 defines an inner volume and an opening configured to allow access into the inner volume. A cover, shown as plate 147, is removably coupled to base 146 with a plurality of fasteners.

Figure 6:
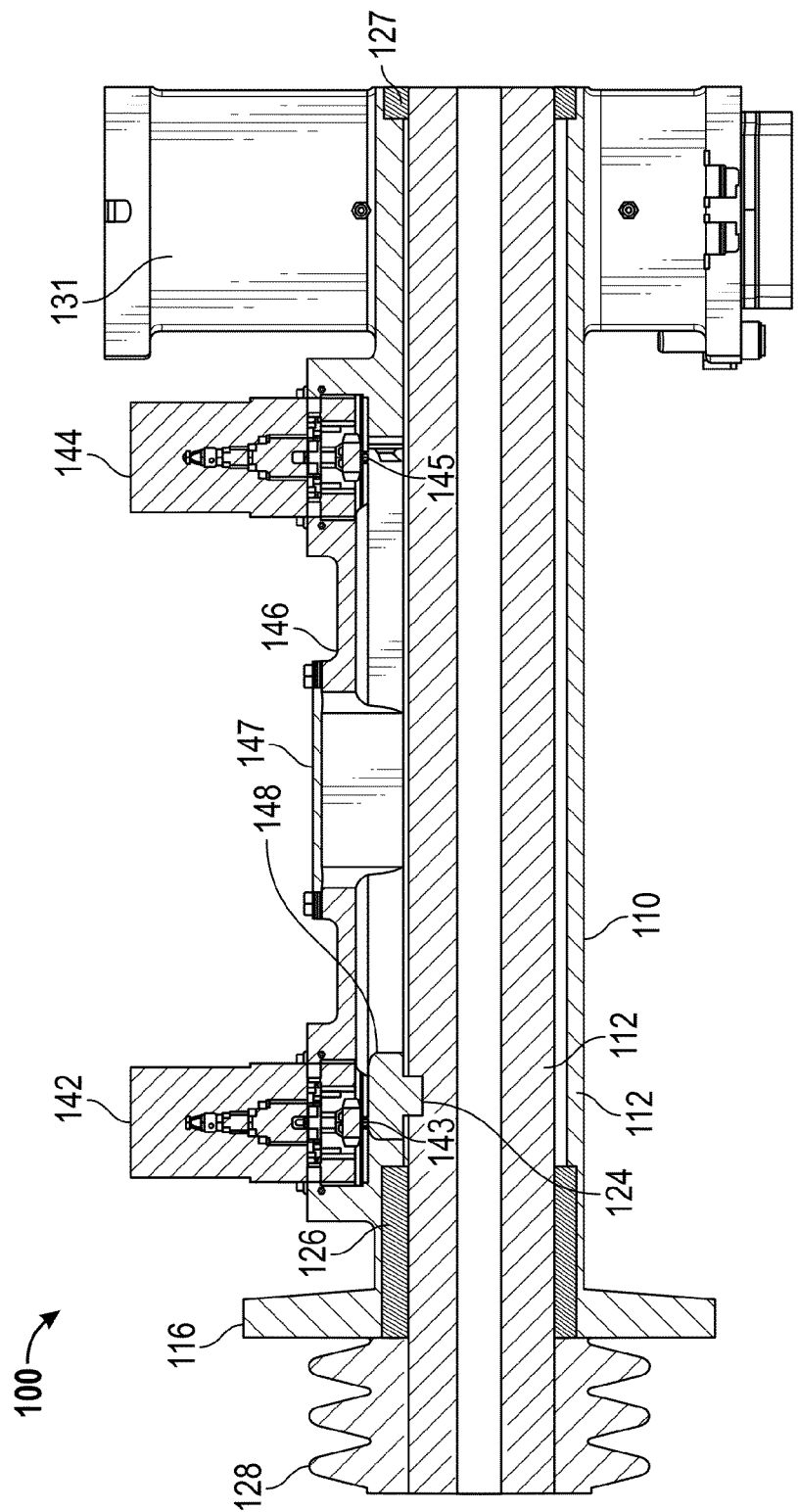
FIG. 6 is a sectional view of a hydraulic motor driven rack and pinion steering assembly, according to an exemplary embodiment.

Referring specifically to the exemplary embodiment shown in FIGS. 4 and 6, relief system 140 includes a stop block, shown as boss 148. In some embodiments, boss 148 is coupled to rack member 120 such that boss 148 moves laterally within the inner volume of base 146 as rack member 120 slides within housing 110. As shown in FIGS. 4 and 6, rack member 120 defines a slot (i.e. striation, fossa, etc.), shown as groove 124, configured to receive boss 148. According to the exemplary embodiment shown in FIG. 4, boss 148 is removably coupled within groove 124 of rack member 120 with a fastener, shown as bolt 149. It is understood that positioning boss 148 within groove 124 reduces the stress on bolt 149 where, by way of example, boss 148 contacts another portion of rack and pinion steering assembly 100 (e.g., a contact surface). Instead of shearing bolt 149, stresses may be transferred through sidewalls of groove 124 and into rack member 120.

According to an exemplary embodiment, first relief valve 142 and second relief valve 144 each include an engagement member, shown as point 143 and point 145, respectively. In some embodiments, boss 148 interfaces with (e.g., contacts, depresses, magnetically interacts with, etc.) point 143 when rack member 120 is located in a first position and interfaces with point 145 when rack member 120 is located in a second position. As shown in FIG. 6, boss 148 depresses point 143 after rack member 120 moves laterally into the first position. According to an exemplary embodiment, first relief valve 142 is actuated as boss 148 interfaces with point 143, and second relief valve 144 is actuated as boss 148 interfaces with point 145. Actuation of first relief valve 142 and second relief valve 144 reduces the pressure of hydraulic flow provided to hydraulic motor 131, according to an exemplary embodiment. In other embodiments, actuation of first relief valve 142 and second relief valve 144 may trigger an alarm, send a signal to a controller configured to turn off a hydraulic pump, or otherwise reduce the likelihood of damage to rack and pinion steering assembly 100.

According to an alternative embodiment, rack and pinion steering assembly 100 may include boss 148 but may not include relief valves, such as relief valves 142 and 144. Rather than interface with point 143 of first relief valve 142 when rack member 120 is in the first lateral position and interface with point 145 of second relief valve 144 when the rack member is in the second lateral position, boss 148 may interface with a first contact surface defined by housing 110 when rack member 120 is in the first lateral position and may interface with a second contact surface defined by housing 110 when rack member 120 is in the second lateral position, according to an exemplary embodiment. By way of example, housing 110 may define a rectangular slot configured to receive boss 148, the slot having a first flat end defining the first contact surface and a second flat end defining the second contact surface. As rack member 120 reaches the first lateral position, a surface of boss 148 may interface (i.e. contact, engage, etc.) the first flat end thereby restricting the lateral movement of rack member 120 without damaging the rack or pinion gear teeth. Similarly, as rack member 120 reaches the second lateral position, an opposing surface of boss 148 may interface (i.e. contact, engage, etc.) the second flat end. While a specific rectangular slot arrangement has been described, it is understood that the limiter may comprise various alternative shapes and configurations of slots, apertures, or other components. According to yet another alternative embodiment, boss 148 may interface with another component of rack and pinion steering assembly 100 to similarly restrain the lateral movement of rack member 120.

According to an exemplary embodiment, the position of boss 148 along rack member 120 establishes the distance rack member 120 may travel in either lateral direction. According to an exemplary embodiment, tie rods coupled to rack member 120 direct wheel and tire assemblies in a straight ahead configuration when boss 148 is positioned at a midpoint between point 143 and point 145. The tie rods may also turn the vehicle to the left when boss 148 interfaces with point 143 and turn the vehicle right when boss 148 interfaces with point 145. According to an alternative embodiment, the relative positions of boss 148, first relief valve 142, and second relief valve 144 establish the distance rack member 120 may travel in either lateral direction. In still other embodiments, the position of boss 148 and contact surfaces defined by housing 110 establish the distance rack member 120 may travel in either lateral direction.

Figure 7:
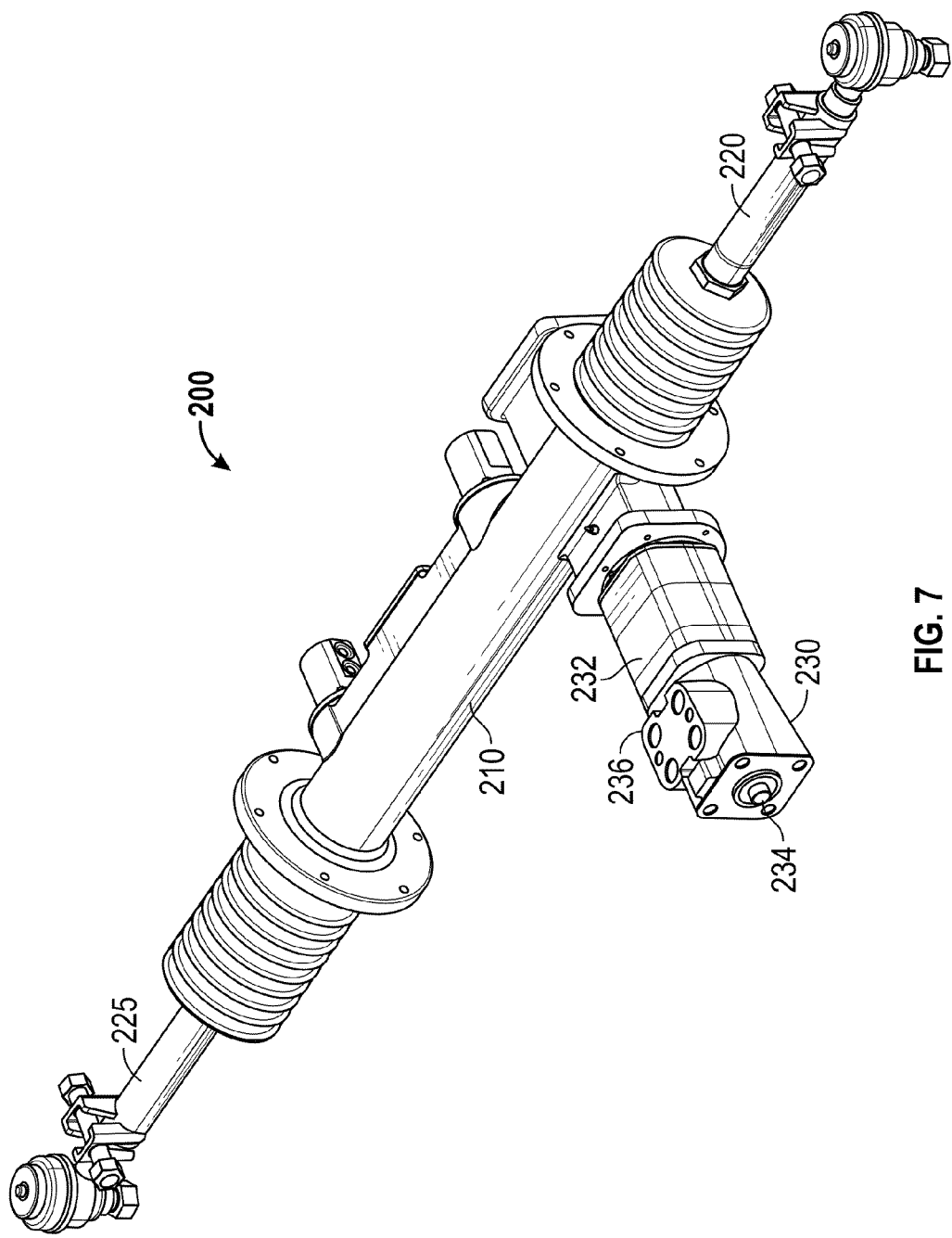
FIG. 7 is an elevation view of a rack and pinion steering assembly having a directly coupled steering valve and integrated motor, according to an exemplary embodiment.

Referring next to the exemplary embodiment shown in FIG. 7, a rack and pinion steering assembly, shown as rack and pinion steering assembly 200, is configured to provide an output steering force to rotate the tires of a vehicle. As shown in FIG. 7, rack and pinion steering assembly 200 includes a housing, shown as housing 210, a first tie rod, shown as tie rod 220, and a second tie rod, shown as tie rod 225. As discussed above, tie rod 220 and tie rod 225 may be configured to engage steering knuckles of an axle assembly and transmit output steering forces to rotate tires of a vehicle.

As shown in FIG. 7, rack and pinion steering assembly 200 includes a valve, shown as steering valve 230. According to an exemplary embodiment, the rack and pinion steering assembly also includes a hydraulic motor, shown as hydraulic motor 232, coupled to the housing. As shown in FIG. 7, hydraulic motor 232 may be coupled between steering valve 230 and housing 210. Such a configuration may reduce a requisite number of hydraulic hoses that join the components of rack and pinion steering assembly 200. In some embodiments, steering valve 230 is in fluid communication with the hydraulic motor. A gear rack within the housing may include gear rack teeth in meshing engagement with pinion gear teeth of a pinion gear. According to an exemplary embodiment, the hydraulic motor rotates the pinion gear as it receives pressurized hydraulic fluid from steering valve 230.

As shown in FIG. 7, steering valve 230 includes a valve body, shown as valve body 231 and an inlet, shown as inlet 234 that engages an input shaft of a vehicle steering system. By way of example, the input shaft may be coupled to the steering column of a vehicle such that rotation of the steering wheel by an operator is transmitted to inlet 234. According to an exemplary embodiment, steering valve 230 also includes a plurality of ports, shown as ports 236. Ports 236 may interface with hydraulic hoses to selectively transmit hydraulic fluid between hydraulic motor 232, a hydraulic pump, a hydraulic reservoir, relief valves, or still other components.

Referring still to the exemplary embodiment shown in FIG. 7, steering valve 230 and hydraulic motor 232 may be directly coupled to housing 210. Such direct coupling may reduce the overall size of rack and pinion steering assembly 200, may reduce the cost or complexity of the assembly (e.g., by removing the need for intermediate shafts), may improve reliability, or may provide still other benefits. In some embodiments, steering valve 230 includes an output shaft configured to rotate with inlet 234. The output shaft may be configured to engage at least one of hydraulic motor 232 and the pinion gear of a rack and pinion steering assembly thereby transmitting an operator's rotation of the steering wheel through steering valve 230.

As shown in FIG. 7, hydraulic motor 232 and steering valve 230 are coupled to housing 210. In other embodiments, steering valve 230 or hydraulic motor 232 may include a female splined portion configured to engage a male splined portion of an inlet shaft of rack and pinion steering assembly 200. In still other embodiments, an intermediate shaft may couple an output of steering valve 230 or hydraulic motor 232 with an input shaft of a rack and pinion steering assembly 200.

Figure 8:
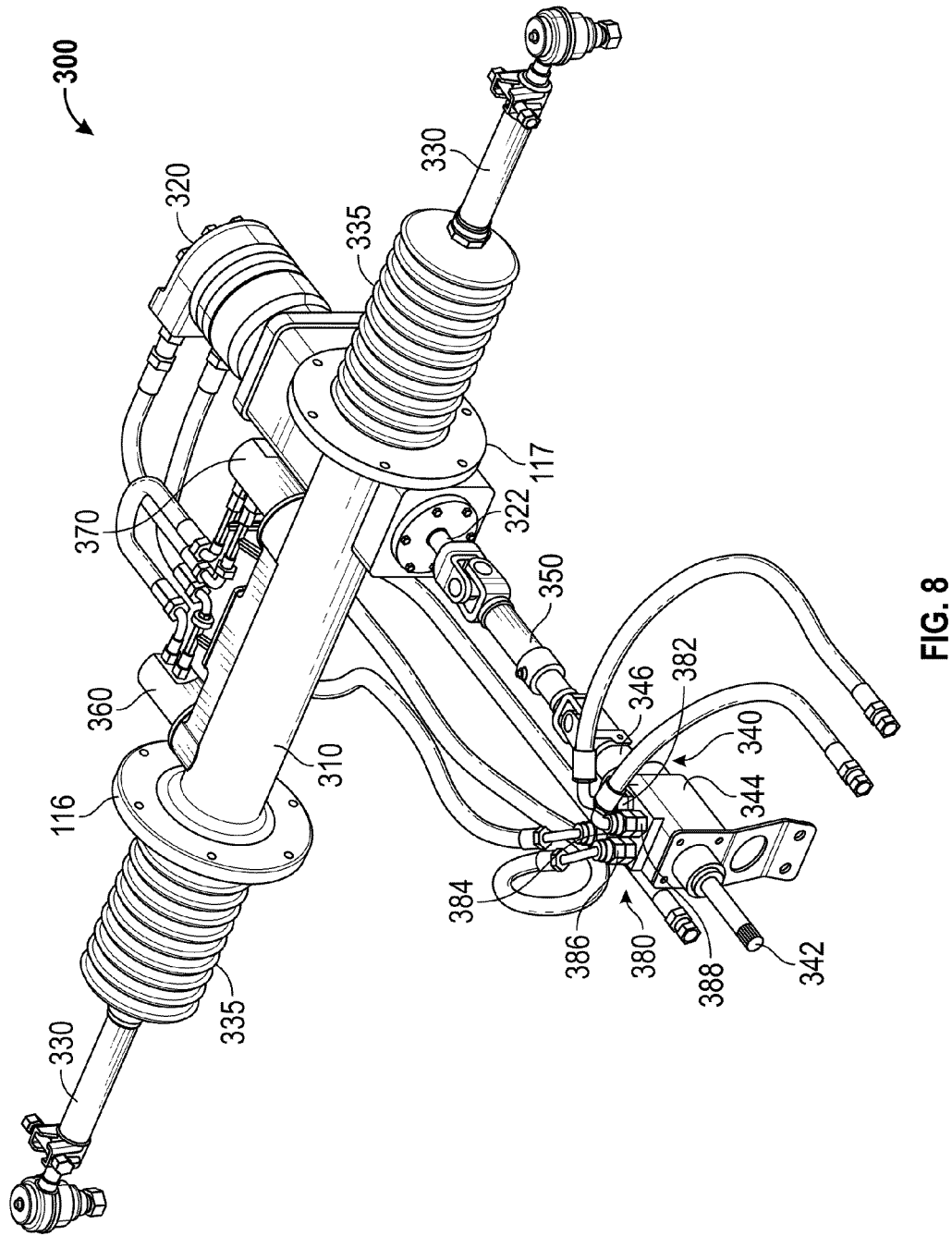
FIG. 8 is an elevation view of a hydraulic system for a hydraulic motor driven rack and pinion steering assembly, according to an exemplary embodiment.
Figure 9:
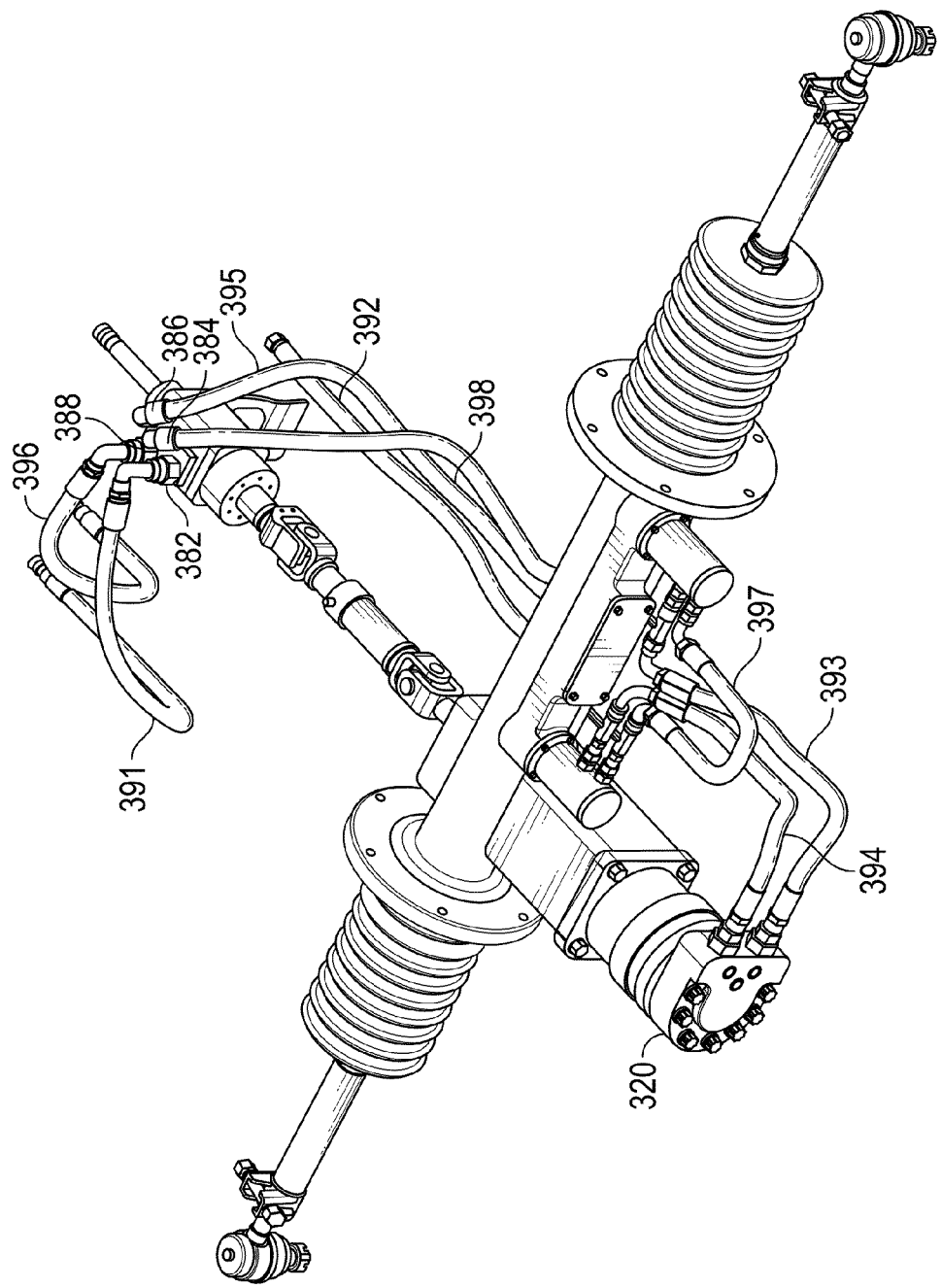
FIG. 9 is an elevation view of a hydraulic system for a hydraulic motor driven rack and pinion steering assembly, according to an exemplary embodiment.
Figure 10:
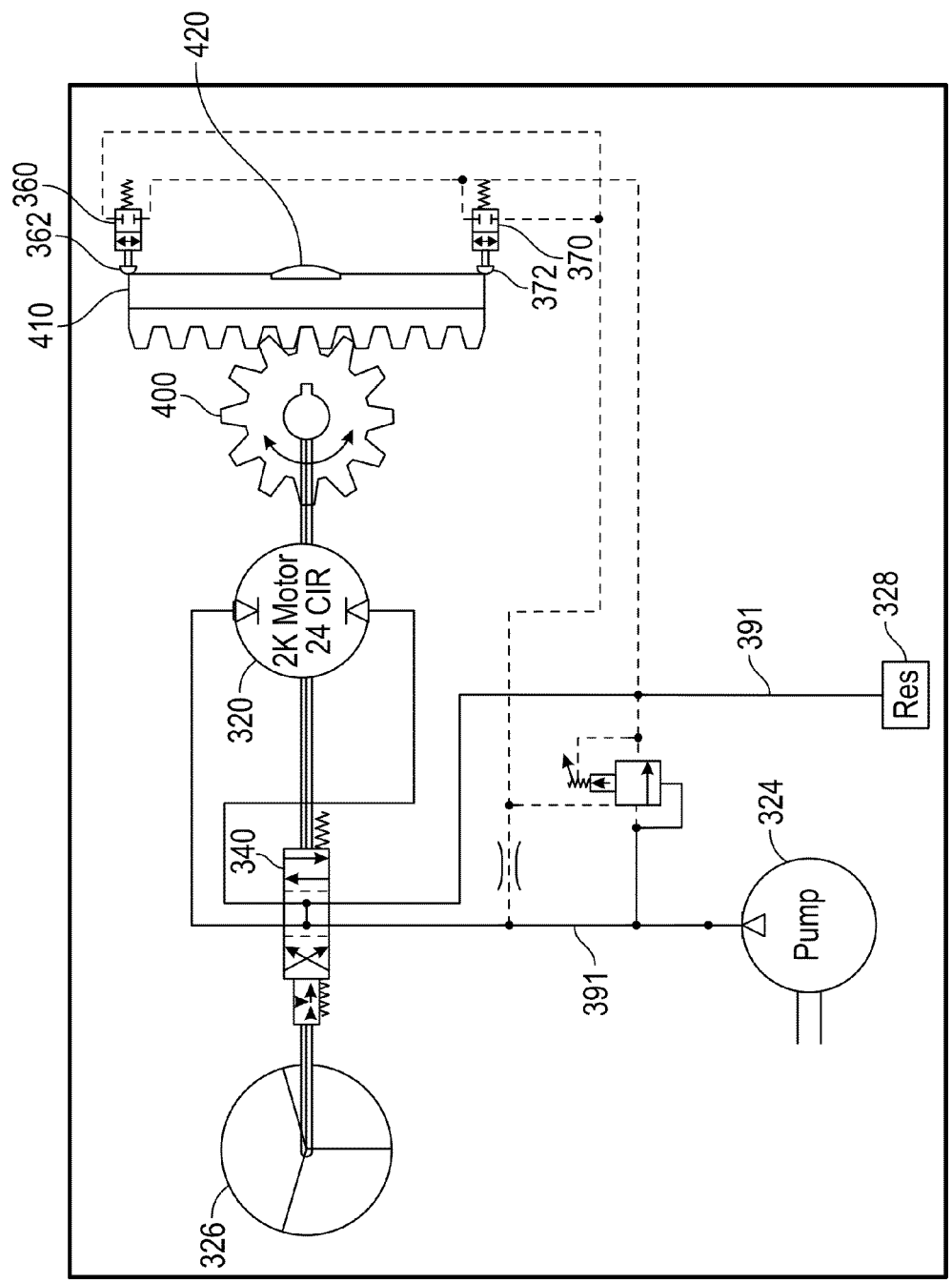
FIG. 10 is a schematic view of a hydraulic system for a hydraulic motor driven rack and pinion steering assembly, according to an exemplary embodiment.

Referring next to the exemplary embodiment shown in FIGS. 8-10, a rack and pinion steering assembly, shown as rack and pinion steering assembly 300, is configured to interact with an arrangement of hydraulic components and provide an output steering force. As shown in FIG. 8, rack and pinion steering assembly 300 includes a housing, shown as housing 310, a driver, shown as hydraulic motor 320, an input shaft, shown as input shaft 322, and tie rods, shown as tie rods 330. According to an exemplary embodiment, rack and pinion steering assembly 300 includes bellows, shown as bellows 335 configured to prevent debris from entering housing 310.

According to an exemplary embodiment, rack and pinion steering assembly 300 includes a valve, shown as steering valve 340. As shown in FIG. 8, steering valve 340 includes an valve inlet shaft, shown as valve inlet shaft 342, a valve body, shown as valve body 344, and a valve outlet, shown as valve outlet 346. Valve outlet 346 may be coupled to input shaft 322 with an intermediate shaft, shown as intermediate coupling shaft 350. According to an exemplary embodiment, intermediate coupling shaft 350 includes an inner portion and an outer portion, the outer portion configured to slide relative to the inner portion and increase or decrease the length of intermediate coupling shaft 350 (e.g., to facilitate relative movement between housing 310 and steering valve 340). While FIG. 8 shows intermediate coupling shaft 350 positioned coaxial with valve inlet shaft 342 and input shaft 322, it should be understood that intermediate coupling shaft 350 may be angularly offset from at least one of valve inlet shaft 342 and input shaft 322. As shown in FIG. 8, intermediate coupling shaft 350 includes a plurality of universal joints configured to further accommodate such an angular offset.

Referring still to the exemplary embodiment shown in FIG. 8, rack and pinion steering assembly 300 includes a relief system that includes, among other components, a first relief valve, shown as first relief valve 360, a second relief valve, shown as second relief valve 370, and a plurality of hydraulic hoses. As shown in FIGS. 8-9, steering valve 340 defines a plurality of ports, shown as ports 380. According to an exemplary embodiment, ports 380 include a first inlet port, shown as pump inlet port 382, a first outlet port, shown as motor outlet port 384, a second inlet port, shown as motor inlet port 386, and a second outlet port, shown as reservoir outlet port 388.

According to an exemplary embodiment, the heavy-duty vehicle includes a rack and pinion steering assembly including hydraulic motor 320 and steering valve 340. As shown schematically in FIG. 10, the heavy-duty vehicle includes a pump, shown as hydraulic pump 324, an input device, shown as steering wheel 326, and a reservoir, shown as hydraulic reservoir 328. According to an exemplary embodiment, hydraulic reservoir 328 stores hydraulic fluid at a first, low pressure, and hydraulic pump 324 increases the pressure of the hydraulic pressure from the first, low pressure to a second, higher pressure. As shown in FIG. 10, hydraulic pump 324 supplies hydraulic fluid at the second, higher pressure to steering valve 340. According to an alternative embodiment, hydraulic pump 324 may provide hydraulic fluid at a second, higher pressure to a high pressure storage tank. The high pressure storage tank may be coupled to an inlet port of steering control valve with a hydraulic hose, and the steering control valve may thereafter provide hydraulic fluid at a second, higher pressure to a hydraulic motor. Such a configuration may provide high pressure hydraulic fluid to a hydraulic motor without needing to continuously operate the hydraulic pump.

In some embodiments, a plurality of hydraulic hoses couple ports 380 to various components of a heavy-duty vehicle. As shown in FIGS. 9-10, hydraulic hose 391 couples hydraulic pump 324 with pump inlet port 382, hydraulic hoses 392 and 393 couple motor outlet port 384 with an inlet port of hydraulic motor 320, hydraulic hoses 394 and 395 couple an outlet port of hydraulic motor 320 with motor inlet port 386, and hydraulic hose 396 couples reservoir outlet port 388 to hydraulic reservoir 328. As shown in FIG. 9, hydraulic hose 397 couples outlet valves of first relief valve 360 and second relief valve 370 to create a low pressure side of first relief valve 360 and second relief valve 370. Hydraulic hose 398 couples the low pressure side with hydraulic reservoir 328.

According to an exemplary embodiment, hydraulic pump 324 supplies hydraulic pressure to pump inlet port 382 of steering valve 340. As discussed above, steering valve 340 may mechanically couple a steering column of the heavy-duty vehicle with a pinion gear such that an operator's torque applied to the steering wheel is transmitted through the pinion gear to move a rack member and apply an output steering force. Such mechanical coupling may be important to, by way of example, allow an operator to steer the heavy-duty vehicle even upon failure of rack and pinion steering assembly 300.

Referring again to the exemplary embodiment shown in FIGS. 8-9, steering valve 340 includes a three position spool. In a first position, the spool inhibits flow between pump inlet port 382 and motor outlet port 384. Rack and pinion steering assembly 300 provides no additional output steering force when steering valve 340 is in the first position. In a second position, the spool couples pump inlet port 382 to motor outlet port 384 and motor inlet port 386 to reservoir outlet port 388. Such coupling rotates hydraulic motor 320 and a pinion gear in a first direction to apply an output steering force in a first direction (e.g., to turn the wheels right). In a third position, the spool couples pump inlet port 382 to motor inlet port 386 and motor outlet port 384 to reservoir outlet port 388. Such coupling rotates hydraulic motor 320 and a pinion gear in a second direction to apply an output steering force in a second direction (e.g., to turn the wheels left). In some embodiments, steering valve 340 is biased toward the first position such that, where the applied strain is reduced (e.g., where the operator stops rotating the steering wheel), no additional output steering force is provided. According to an alternative embodiment, the spool may be actuated between more or fewer positions to provide additional resolution to the system.

Referring to the exemplary embodiment shown in FIG. 10, the rack and pinion steering assembly provides an additional output steering force. In operation, an operator may turn steering wheel 326 and apply a strain to a rod within steering valve 340. In response to the magnitude of applied strain, steering valve 340 may actuate an internal spool, the spool having a plurality of apertures defining potential flow paths. In some embodiments, steering valve 340 may include a binary internal spool (i.e. that operates only in discrete positions). Rack and pinion steering assembly 300 may vary the output steering force by applying hydraulic fluid at a different pressure. In other embodiments, steering valve 340 may include an incrementally movable spool that regulates a flow rate of hydraulic fluid to hydraulic motor 320. Rack and pinion steering assembly 300 having an incrementally movable spool may vary the output steering force while allowing hydraulic pump 324 to supply hydraulic fluid at a constant pressure.

Referring still to the exemplary embodiment shown in FIG. 10, hydraulic fluid interacts with internal components within hydraulic motor 320 to rotate an output shaft. As discussed above, the output shaft may be coupled to a pinion gear, shown as pinion gear 400, having gear teeth in meshing engagement with a rack member, shown as rack member 410. In some embodiments, rotation of pinion gear 400 applies an output steering force through rack member 410 and rack member 410 translates between a first position and a second position. A stop block, shown as boss 420, is coupled to and translates with rack member 410. As shown in FIG. 10, boss 420 is positioned between an engagement member of first relief valve 360, shown as point 362, and an engagement member of second relief valve 370, shown as point 372. From the position shown in FIG. 10, rack member 410 may translate 6.375 inches in either direction before boss 420 actuates first relief valve 360 or second relief valve 370.

In some embodiments, first relief valve 360 and second relief valve 370 include internal spools that flow hydraulic fluid upon actuation (e.g., as points 362 and 372 are depressed by boss 420). As shown in FIG. 10, first relief valve 360 and second relief valve 370 include inlet ports coupled in parallel to a high pressure flow that actuates hydraulic motor 320. According to an exemplary embodiment, the high pressure flow is exhausted through the spools of first relief valve 360 and second relief valve 370 as boss 420 interfaces with points 362 and 372. By way of example, boss 420 may interface with points 362 and 372 as rack member 410 reaches a first lateral position and a second lateral position.

As shown in FIG. 10, the exhausted hydraulic fluid flows into hydraulic reservoir 328. Where the high pressure flow is exhausted, hydraulic motor 320 may no longer provide an output torque thereby reducing the supplemental output steering force from the rack and pinion steering assembly. Such a relief system configured to selectively exhaust high pressure flow may reduce the risk of over travel damage to a rack and pinion steering assembly for a heavy-duty vehicle because the hydraulically assisted output steering force is reduced or eliminated upon actuation of first relief valve 360 or second relief valve 370. The rack and pinion steering assembly may again provide an output steering force once boss 420 no longer actuates first relief valve 360 or second relief valve 370 (e.g., as an operator rotates the pinion gear and translates the rack member with the steering wheel).

Figure 11:
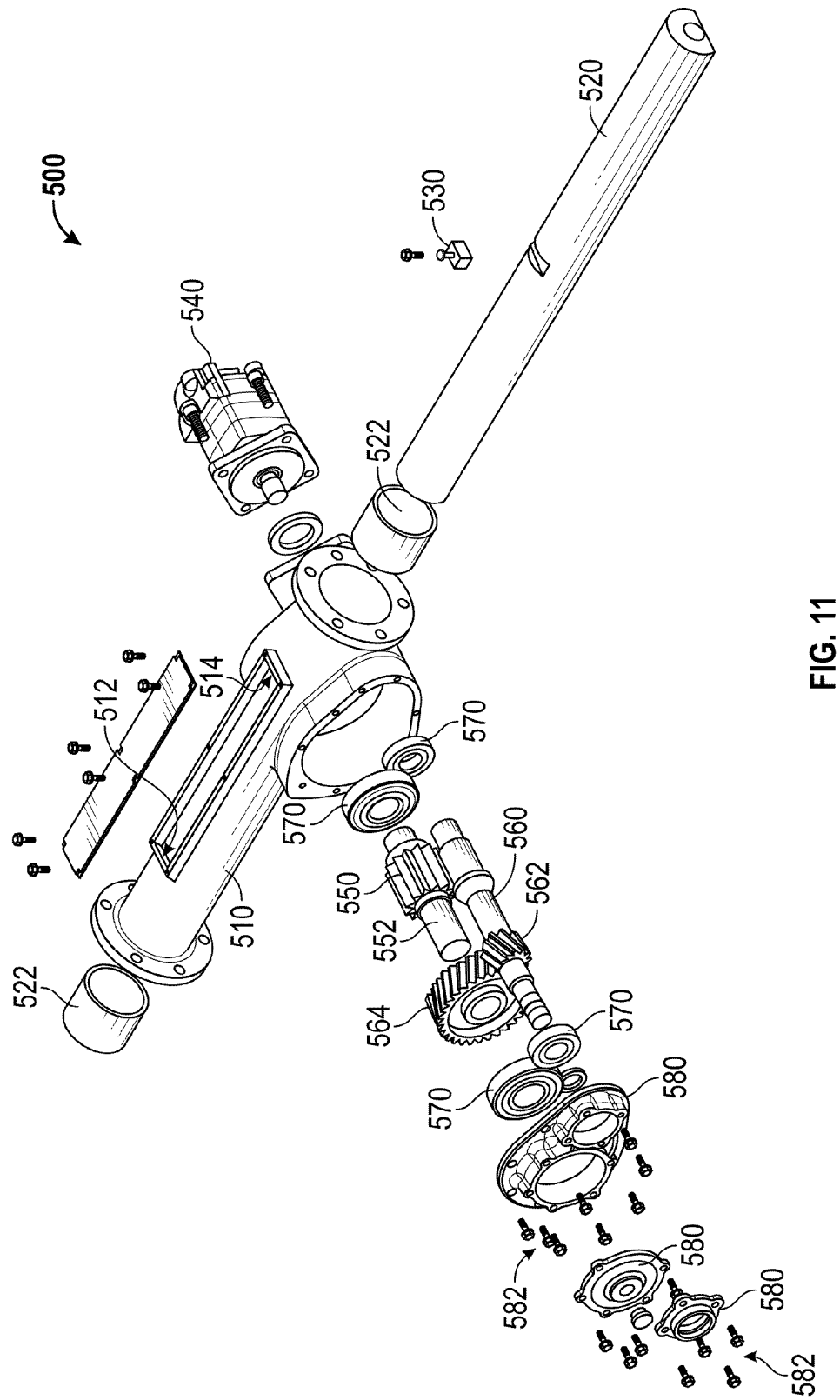
FIG. 11 is an exploded view of a hydraulic motor driven rack and pinion steering assembly having an intermediate shaft, according to an exemplary embodiment.

Referring next to the alternative embodiment shown in FIG. 11, a rack and pinion steering assembly, shown as rack and pinion steering assembly 500, is configured to provide at least one of a preferred final gear ratio, operating speed for the hydraulic motor, and rack travel distance. As shown in FIG. 11, rack and pinion steering assembly 500 includes a housing, shown as housing 510, and a gear rack, shown as rack member 520, slidably coupled to housing 510 with a bearings, shown as sleeve bearings 522. According to an exemplary embodiment, rack and pinion steering assembly 500 includes a limiter comprising a stop block, shown as boss 530, and a plurality of contact surfaces 512 and 514 defined within housing 510. In some embodiments, boss 530 interfaces with contact surfaces 512 and 514 to constrain the translation of rack member 520 between a first lateral position and a second lateral position.

According to an exemplary embodiment, rack and pinion steering assembly 500 includes gears and shafts configured to couple a steering wheel of a heavy-duty vehicle and a driver, shown as hydraulic motor 540 with rack member 520. As shown in FIG. 11, rack and pinion steering assembly 500 includes a pinion gear, shown as pinion gear 550, coupled to a shaft, shown as pinion shaft 552. According to an exemplary embodiment, a shaft, shown as intermediate shaft 560 includes a first end configured to engage hydraulic motor 540 (e.g., through a coupler) and a second end configured to engage a steering wheel of a heavy-duty vehicle (e.g., through intermediate shafts and a steering column). Bearings, shown as bearings 570 rotatably couple intermediate shaft 560 and pinion shaft 552 to housing 510. Covers, shown as covers 580 may be secured to housing 510 with a plurality of fasteners, shown as bolts 582.

As shown in FIG. 11, a first gear, shown as gear 562, is coupled to intermediate shaft 560 and a second gear, shown as gear 564, is coupled to pinion shaft 552. Meshing engagement between gears 562 and 564 couple the rotation of intermediate shaft 560 with pinion gear 550. In some embodiments, hydraulic motor 540 or an operator may apply a torque on pinion gear 550. As shown in FIG. 11, intermediate shaft 560 is offset from pinion shaft 552 and extends across from a first side to a second side of rack member 520. Such a configuration reduces the number of components required to provide a gearing modification (e.g., a reduction) and provides a compact rack and pinion steering assembly relative to other alternative designs (e.g., those with intermediate gears between a motor output gear and a pinion gear, etc.).

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the enclosure may be constructed from any of a wide variety of materials that provide sufficient strength or durability, in any of a wide variety of colors, textures, and combinations. Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner. Accordingly, all such modifications are intended to be included within the scope of the present inventions. The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A rack and pinion steering apparatus for a heavy-duty vehicle, comprising:
   a housing;
   a gear rack slidably coupled to the housing and comprising a plurality of rack gear teeth, wherein the gear rack is moveable between a first lateral position and a second lateral position;
   a pinion gear comprising a plurality of pinion gear teeth in meshing engagement with the plurality of rack gear teeth;
   a hydraulic motor comprising an output shaft coupled to and configured to rotate the pinion gear; and
   a limiter coupled to the housing and configured to reduce an output steering force of the gear rack, wherein the limiter comprises a stop block releasably coupled to the gear rack with a fastener, and wherein the gear rack defines a slot configured to receive the stop block.

2. The apparatus of claim 1, wherein the limiter further comprises a relief valve having an engagement member configured to interface with the stop block when the gear rack is in the first lateral position.

3. The apparatus of claim 2, wherein the limiter further comprises a second relief valve having a second engagement member configured to interface with the stop block when the gear rack is in the second lateral position.

4. The apparatus of claim 1, wherein the housing defines a first contact surface and a second contact surface configured to limit the lateral movement of the gear rack, the stop block engaging the first contact surface when the gear rack is in the first lateral position and the second contact surface when the gear rack is in the second lateral position.

5. The apparatus of claim 1, further comprising a shaft coupled to the pinion gear, the shaft having a first end configured to engage the hydraulic motor and a second end defining a manual input.

6. The apparatus of claim 5, wherein the shaft and the pinion gear are positioned coaxially with the output shaft of the hydraulic motor.

7. A rack and pinion steering apparatus for a heavy-duty vehicle, comprising:
- a housing;
- a gear rack slidably coupled to the housing and comprising a plurality of rack gear teeth, wherein the gear rack is moveable between a first lateral position and a second lateral position;
- a pinion gear comprising a plurality of pinion gear teeth in meshing engagement with the plurality of rack gear teeth;
- a hydraulic motor comprising an output shaft coupled to and configured to rotate the pinion gear; and
- a limiter coupled to the housing and configured to reduce an output steering force of the gear rack, wherein the limiter includes:
  - a stop block coupled to the gear rack; and
  - a relief valve having an engagement member configured to interface with the stop block when the gear rack is in the first lateral position.

8. The apparatus of claim 7, wherein the limiter further comprises a second relief valve having a second engagement member configured to interface with the stop block when the gear rack is in the second lateral position.

9. The apparatus of claim 7, wherein the housing defines a first contact surface and a second contact surface configured to limit the lateral movement of the gear rack, the stop block engaging the first contact surface when the gear rack is in the first lateral position and the second contact surface when the gear rack is in the second lateral position.

10. The apparatus of claim 7, further comprising a shaft coupled to the pinion gear, the shaft having a first end configured to engage the hydraulic motor and a second end defining a manual input.

11. The apparatus of claim 10, wherein the shaft and the pinion gear are positioned coaxially with the output shaft of the hydraulic motor.

* * * * *